US007557908B1

(12) United States Patent
Nagasaka et al.

(10) Patent No.: US 7,557,908 B1
(45) Date of Patent: Jul. 7, 2009

(54) APPARATUS FOR DETERMINING THE AUTHENTICITY

(75) Inventors: Keiji Nagasaka, Hyogo (JP); Kazuo Fujiwara, Hyogo (JP)

(73) Assignee: Glory Ltd., Hyogo (JP)

(*) Notice: Subject to any disclaimer, the term of this patent is extended or adjusted under 35 U.S.C. 154(b) by 0 days.

(21) Appl. No.: 12/199,132

(22) Filed: Aug. 27, 2008

(51) Int. Cl.
*G06K 9/74* (2006.01)

(52) U.S. Cl. ........................................ 356/71; 235/491

(58) Field of Classification Search .................. 356/71; 235/491
See application file for complete search history.

(56) References Cited

U.S. PATENT DOCUMENTS 6,936,834 B2 * 8/2005 Henry et al. ............ 250/559.4
2003/0005303 A1 * 1/2003 Auslander et al. ........... 713/176

FOREIGN PATENT DOCUMENTS

JP 2007-136838 A 6/2007

* cited by examiner

*Primary Examiner*—Roy Punnoose
(74) *Attorney, Agent, or Firm*—Foley & Lardner LLP

(57) ABSTRACT

An apparatus for determining the authenticity includes a light-emitting unit that emits a light including the first wavelength to the paper sheet; a first blocking unit that is arranged between the light-emitting unit and the paper sheet, and blocks off a light of a wavelength longer than the first wavelength; a light-receiving unit that receives a light including a second wavelength emitted from the paper sheet; a second blocking unit that is arranged between the light-receiving unit and the paper sheet, and blocks off a light of a wavelength shorter than the second wavelength. Finally, an authenticity determining unit determines an authenticity of the paper sheet based on the light received by the light-receiving unit.

10 Claims, 9 Drawing Sheets

APPARATUS FOR DETERMINING THE AUTHENTICITY

BACKGROUND OF THE INVENTION

1. Field of the Invention

The present invention relates to an apparatus for determining the authenticity that determines an authenticity of a sheet to which is attached such a substance that excites a light including a second wavelength longer than a first wavelength when irradiated with a light including the first wavelength.

2. Description of the Related Art

There has been known such an apparatus for determining the authenticity that conveys a paper sheet such as a gift certificate with a conveying mechanism, and determines whether the paper sheet is authentic or counterfeit with an optical sensor capable of emitting/receiving a light. The light can be a visible light or an infrared light. Furthermore, from the viewpoint of prevention from counterfeiting the paper sheet, characters or a pattern has been printed on the paper sheet with phosphor-containing ink, which is invisible to the human eye, in recent years.

When irradiated with an excitation light of a predetermined wavelength (for example, a visible light or an infrared light), such phosphor-containing ink emits an invisible light (for example, an infrared light) of a different wavelength from that of the excitation light.

There has been developed an apparatus for determining the authenticity that makes use of these characteristics of the phosphor-containing ink. Specifically, a latent-image mark is printed in advance on a paper sheet with anti-counterfeit ink such as phosphor-containing ink. The apparatus for determining the authenticity emits an excitation light of a predetermined wavelength to the paper sheet, and detects the latent-image mark by receiving a fluorescence emitted from the phosphor-containing ink. The apparatus for determining the authenticity determines the authenticity of the paper sheet based on whether the latent-image mark is detected.

For example, Japanese Patent Application Laid-open No. 2007-136838 discloses such a technology that an invisible bar code formed with anti-counterfeit ink that emits an infrared light when irradiated with a visible light or an infrared light is printed in advance on a printed matter. Therefore, the authenticity of the printed matter can be determined by reading the bar code.

However, when such authenticity determination of a paper sheet with the use of characteristics of anti-counterfeit ink, which emits a light of a different wavelength from that of an excitation light, is performed, an overlap between the wavelength of the excitation light and the wavelength of the light emitted from the anti-counterfeit ink becomes a problem. Specifically, a light source (for example, a light-emitting diode) for emitting an excitation light to a paper sheet emits a light in a predetermined range of wavelengths. That is, the excitation light may include a light of the same wavelength as the light emitted from the anti-counterfeit ink.

In other words, a light-receiving sensor receives the excitation light, which is reflected on the paper sheet or passes through the paper sheet, together with the light emitted from the anti-counterfeit ink. Therefore, it is difficult for the light-receiving sensor to receive only the light emitted from the anti-counterfeit ink. Consequently, in the past, a detection accuracy of a latent-image mark printed with anti-counterfeit ink or the like was not good enough, so that an accuracy of authenticity determination of a paper sheet was insufficient as well.

Incidentally, as a light source for emitting an excitation light, the one capable of emitting a light of a single wavelength can be used. However, such a light source is expensive, so that the use of the light source will disadvantageously lead to the increase in production cost of the apparatus for determining the authenticity.

SUMMARY OF THE INVENTION

It is an object of the present invention to at least partially solve the problems in the conventional technology.

To solve the above problems and to achieve the above object, according to the present invention, there is provided an apparatus for determining the authenticity that determines the authenticity of a paper sheet to which such a substance that excites a light including a second wavelength longer than a first wavelength when irradiated with a light including the first wavelength is attached. The apparatus for determining the authenticity includes a light-emitting unit that emits the light including the first wavelength to the paper sheet; a first blocking unit that is arranged between the light-emitting unit and the paper sheet, and blocks off a wavelength longer than the first wavelength; a light-receiving unit that receives a light including the second wavelength emitted from the paper sheet; a second blocking unit that is arranged between the light-receiving unit and the paper sheet, and blocks off a wavelength shorter than the second wavelength; and an authenticity determining unit that determines the authenticity of the paper sheet based on the light received by the light-receiving unit.

Moreover, in the above invention, the light-emitting unit collects a light emitted from a light source, and emits the collected light to the paper sheet.

Moreover, in the above invention, the apparatus for determining the authenticity includes a first narrowing unit that is arranged between the first blocking unit and the paper sheet, and narrows a light transmitted through the first blocking unit to have a circular shape; and a second narrowing unit that is arranged between the second blocking unit and the paper sheet to be opposed to the first narrowing unit, and narrows a light emitted from the paper sheet to have a circular shape.

Moreover, in the above invention, the first wavelength is a wavelength in a range of 750 nanometers to 810 nanometers, and the second wavelength is a wavelength in a range of 880 nanometers to 1000 nanometers.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of an apparatus for determining the authenticity according to the present invention will be explained in detail below with reference to the accompanying drawings. Incidentally, it is assumed that the apparatus for determining the authenticity explained in the embodiments below determines the authenticity of a paper sheet to which anti-counterfeit ink is attached. The paper sheet can be a coupon ticket, a gift certificate, valuable securities, a credit card, and the like.

Figure 1:
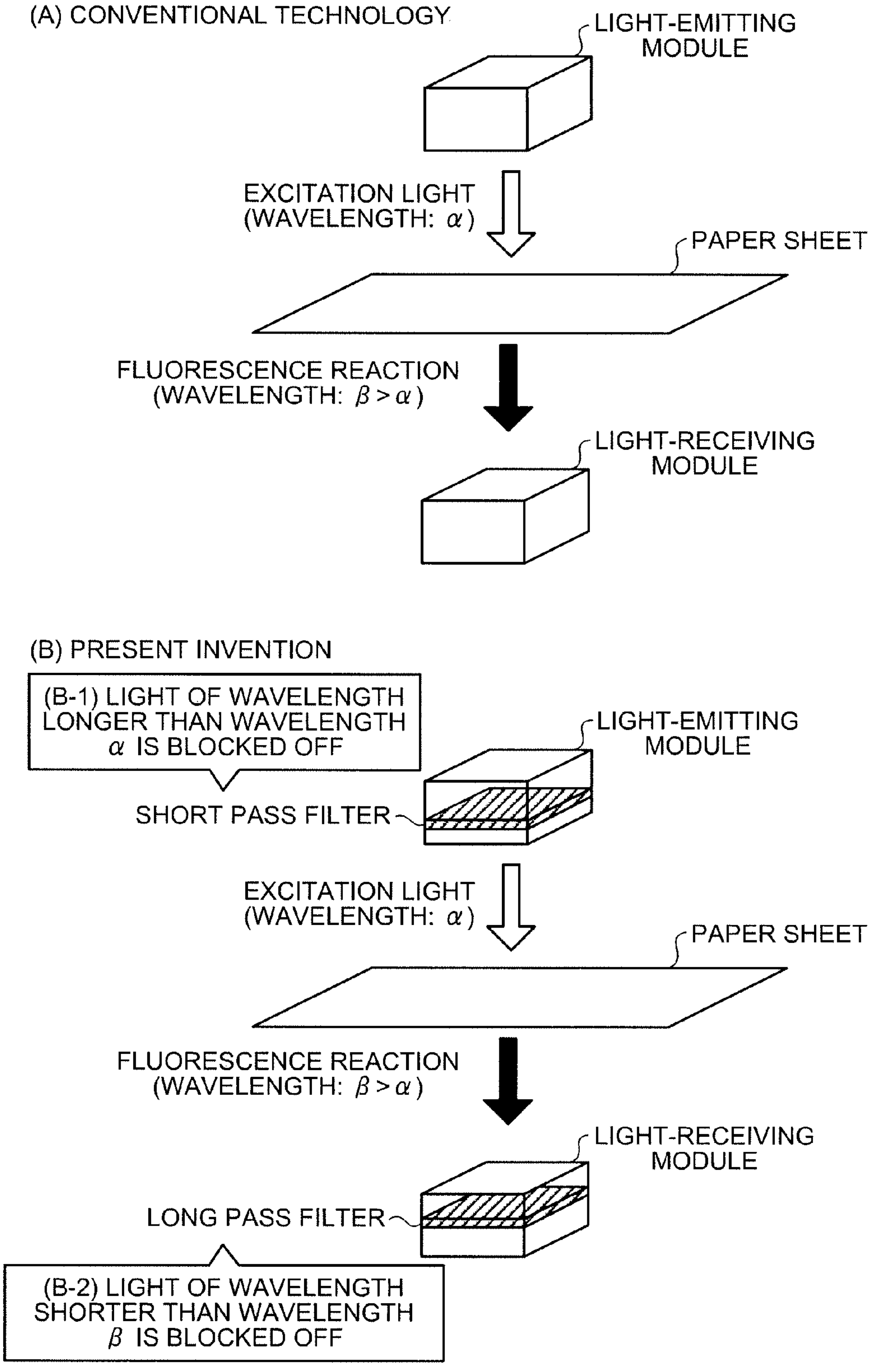
FIG. 1 is a schematic diagram for explaining an outline of a method for determining the authenticity according to the present invention.

First, an outline of an authenticity determining method according to the present invention will be explained below with reference to FIG. 1. FIG. 1 is a schematic diagram for explaining the outline of the authenticity determining method according to the present invention. A portion (A) in FIG. 1 illustrates an authenticity determining method according to a conventional technology, and a portion (B) in FIG. 1 illustrates the authenticity determining method according to the present invention.

Incidentally, it is assumed that anti-counterfeit ink is attached to a paper sheet shown in FIG. 1, for example, by being printed thereon. When irradiated with such an excitation light that a center wavelength of which is a wavelength $\alpha$, the anti-counterfeit ink emits a light of a wavelength $\beta$ longer than the wavelength $\alpha$ by a fluorescence reaction. For example, the wavelength $\alpha$ is in a range of 750 nanometers (nm) to 810 nm, and the wavelength $\beta$ is about 900 nm.

As shown in the portion (A) in FIG. 1, in the conventional technology, when a light-emitting module including a light source such as a light-emitting diode emits an excitation light including the wavelength $\alpha$ to the paper sheet, the anti-counterfeit ink attached to the paper sheet emits a light of the wavelength $\beta$ by a fluorescence reaction. A light-receiving module including a light-receiving device such as a photodiode receives the light of the wavelength $\beta$. A photodiode that has wavelength characteristics with a peak around the wavelength $\beta$ is employed. However, the photodiode has a predetermined range in detection wavelengths, i.e., the photodiode also senses lights of wavelengths shorter than the wavelength $\beta$.

Furthermore, a light emitted from the light source of the light-emitting module includes a light of the wavelength $\alpha$, but also includes a light of a wavelength longer than the wavelength $\alpha$ and a light of a wavelength shorter than the wavelength $\alpha$.

Therefore, the light-receiving module receives not only the light from the anti-counterfeit ink emitted by the fluorescence reaction but also the light emitted by the light-emitting module or a light other than that is emitted by the fluorescence reaction. Thus, the light-receiving module has such a problem that a detection accuracy of a latent-image mark formed with the anti-counterfeit ink is insufficient.

To solve the problem, in the authenticity determining method according to the present invention, a short pass filter (a filter that transmits a light of a wavelength equal to or shorter than a predetermined wavelength, i.e., a filter that blocks off a light of a wavelength longer than the predetermined wavelength) is provided in the light-emitting module, and a long pass filter (a filter that transmits a light of a wavelength equal to or longer than a predetermined wavelength, i.e., a filter that blocks off a light of a wavelength shorter than the predetermined wavelength) is provided in the light-receiving module.

Specifically, as shown in the portion (B) in FIG. 1, a short pass filter that blocks off a light of a wavelength longer than the wavelength $\alpha$ is provided in the light-emitting module (see a comment (B-1) in FIG. 1), and a long pass filter that blocks off a light of a wavelength shorter than the wavelength $\beta$ is provided in the light-receiving module (see a comment (B-2) in FIG. 1). Therefore, the light-receiving module can reliably receive the light emitted from the anti-counterfeit ink attached to the paper sheet by the fluorescence reaction without receiving the light emitted from the light-emitting module or the like.

The above technique with the use of the short pass filter and the long pass filter makes it possible to produce an apparatus for determining the authenticity cheaper as compared with such a technique that a light source capable of emitting a light of a single wavelength is used as the light source of the light-emitting module. Therefore, by applying the apparatus for determining the authenticity determining method according to the present invention to an apparatus for determining the authenticity, it is possible to produce the apparatus for determining the authenticity at low cost.

An apparatus for determining the authenticity employing the authenticity determining method according to the present invention as explained above with reference to FIG. 1 will be explained below with reference to FIGS. 2 to 11.

Figure 2:
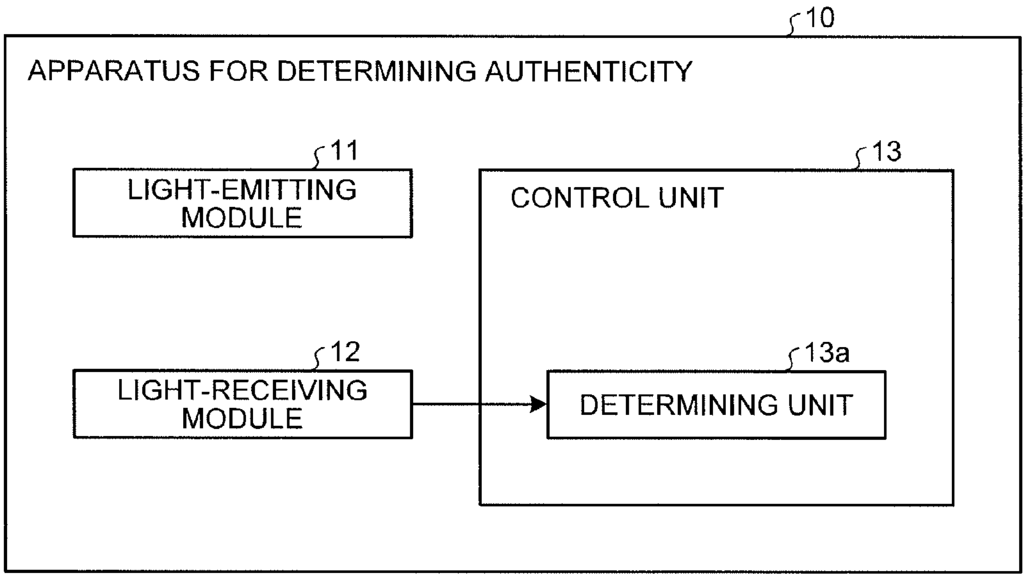
FIG. 2 is a block diagram of a configuration of an apparatus for determining the authenticity.

First, a configuration of an apparatus for determining the authenticity 10 according to an embodiment of the present invention is explained with reference to FIG. 2. FIG. 2 is a block diagram showing the configuration of the apparatus for determining the authenticity 10. As shown in FIG. 2, the apparatus for determining the authenticity 10 includes a light-emitting module 11, a light-receiving module 12, and a control unit 13. The control unit 13 further includes a determining unit 13*a*. Incidentally, only elements required for explaining characteristics of the apparatus for determining the authenticity 10 are depicted in FIG. 2.

The light-emitting module 11 is a module including the short pass filter shown in FIG. 1. The light-emitting module 11 emits an excitation light to a paper sheet to which anti-counterfeit ink is attached, as an object of authenticity determination, to induce a fluorescence reaction of the anti-counterfeit ink. Specifically, the light-emitting module 11 emits only a light transmitted through the short pass filter to the paper sheet. Incidentally, the control unit 13 can be configured to control a timing of emission and an amount of light to be emitted by the light-emitting module 11. A configuration of the light-emitting module 11 will be explained in detail later.

The light-receiving module 12 is a module including the long pass filter shown in FIG. 1. The light-receiving module 12 receives a light emitted by the fluorescence reaction of the anti-counterfeit ink. Specifically, the light-receiving module 12 senses only a light passing through long pass filter with a light-receiving device such as a photodiode. Then, the light-receiving module 12 outputs a signal indicating an intensity of the received light to the determining unit 13*a* of the control unit 13. A configuration of the light-receiving module 12 will be explained in detail later.

The control unit 13 controls the entire apparatus for determining the authenticity 10, and also serves as a processing unit that performs a process of determining the authenticity of the paper sheet based on the signal received from the light-receiving module 12. Specifically, the determining unit 13*a* determines whether the light intensity indicated by the signal received from the light-receiving module 12 exceeds a predetermined threshold, and determines whether the paper sheet is authentic or counterfeit. For example, when the light intensity indicated in the received signal exceeds the predetermined threshold, the determining unit 13*a* determines that the paper sheet is authentic. Incidentally, it is assumed that a predetermined threshold by each type of paper sheets is stored in a storage unit (not shown).

Figure 3:
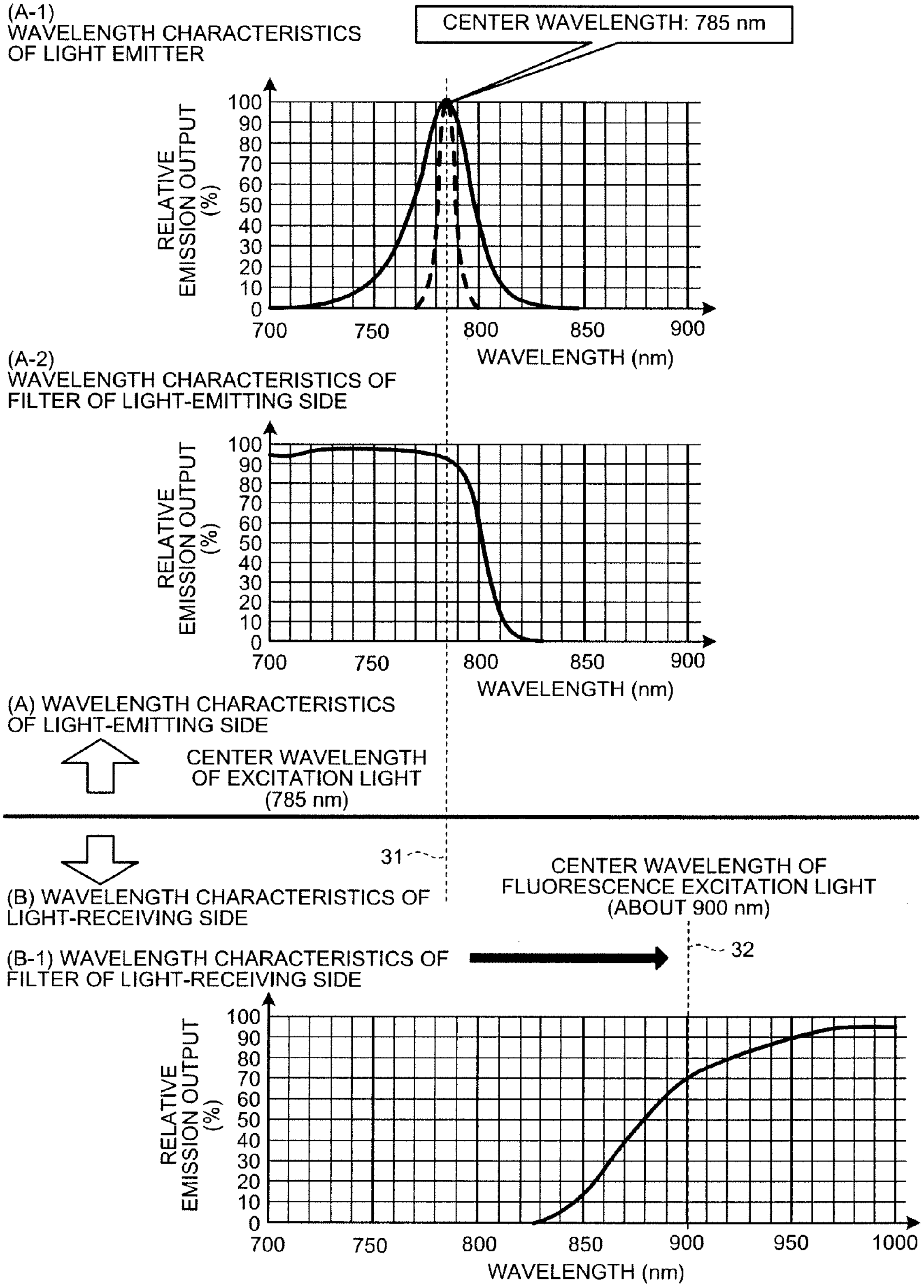
FIG. 3 is a schematic diagram of wavelength characteristics of a light-emitting side and a light-receiving side.

Subsequently, wavelength characteristics of the light-emitting module 11 and the light-receiving module 12 are explained with reference to FIG. 3. FIG. 3 is a schematic diagram showing the wavelength characteristics of the light-emitting side and the light-receiving side. Incidentally, "the light-emitting side" means the light-emitting module 11, and "the light-receiving side" means the light-receiving module 12.

In a portion (A) in FIG. 3, as "the wavelength characteristics of the light-emitting side", wavelength characteristics of a light emitter (a light source) (see a graph (A-1) in FIG. 3) and wavelength characteristics of a filter of the light-emitting side (see a graph (A-2) in FIG. 3) are illustrated. In a portion (B) in FIG. 3, as "the wavelength characteristics of the light-receiving side", wavelength characteristics of a filter of the light-receiving side (see a graph (B-1) in FIG. 3) are illustrated.

When a light-emitting diode is used as the light emitter (the light source), wavelength characteristics of the light-emitting diode are expressed by a curve having a center wavelength of 785 nm as indicated by a solid line shown in the graph (A-1) in FIG. 3. On the other hand, when a laser diode is used as the light emitter (the light source), wavelength characteristics of the laser diode are expressed by a curve having a center wavelength of 785 nm as indicated by a dashed line shown in the graph (A-1) in FIG. 3.

In each of the graphs shown in FIG. 3, a longitudinal axis indicates a relative emission output (%) with respect to the emission output of the center wavelength assumed as 100%, and a horizontal axis indicates a wavelength (nm).

The light emitter (the light source) emits a light in a range of about 700 nm to about 850 nm, and the center wavelength of the light is a peak wavelength (see the curve indicated by the solid line shown in the graph (A-1) in FIG. 3). This is because it is preferable to project a light in a range of 750 nm to 810 nm to the paper sheet to sense the excitation light.

The light-emitting module 11 limits wavelengths of a light to be emitted from the light-emitting module 11 with the filter of the light-emitting side (the short pass filter). Specifically, with the short pass filter having the wavelength characteristics shown in the graph (A-2) in FIG. 3, the light-emitting module 11 cuts (blocks) off a light of a wavelength longer than the center wavelength while transmitting a center wavelength of an excitation light. In other words, a light of a wavelength of 830 nm or longer is completely blocked off (the relative emission output is 0%).

In this manner, when the excitation light having the center wavelength of 785 nm (see a reference numeral 31 in FIG. 3) is emitted to the paper sheet, a light having a center wavelength of about 900 nm is excited by a fluorescence reaction of the anti-counterfeit ink attached to the paper sheet (see a reference numeral 32 in FIG. 3). Therefore, the light-receiving side (the light-receiving module 12) needs to reliably receive the fluorescence excitation light having the center wavelength 32. Thus, the light-receiving side (the light-receiving module 12) is preferably configured to receive a light in a range of 880 nm to 1000 nm.

Therefore, as shown in the graph (B-1) in FIG. 3, the light-receiving module 12 limits a wavelength of a light to be input to the light-receiving device such as a photodiode with the filter of the light-receiving side (the long pass filter). Specifically, with the long pass filter having the wavelength characteristics shown in the graph (B-1) in FIG. 3, the light-receiving module 12 lets the fluorescence excitation light having the center wavelength 32 to pass through the long pass filter. In other words, a light of a wavelength of 830 nm or shorter is completely blocked off by the long pass filter (the relative emission output is 0%), so that a light (a light of a wavelength of 830 nm or less) emitted from the light-emitting side (the light-emitting module 11) is definitely not input to the light-receiving device.

Figure 4:
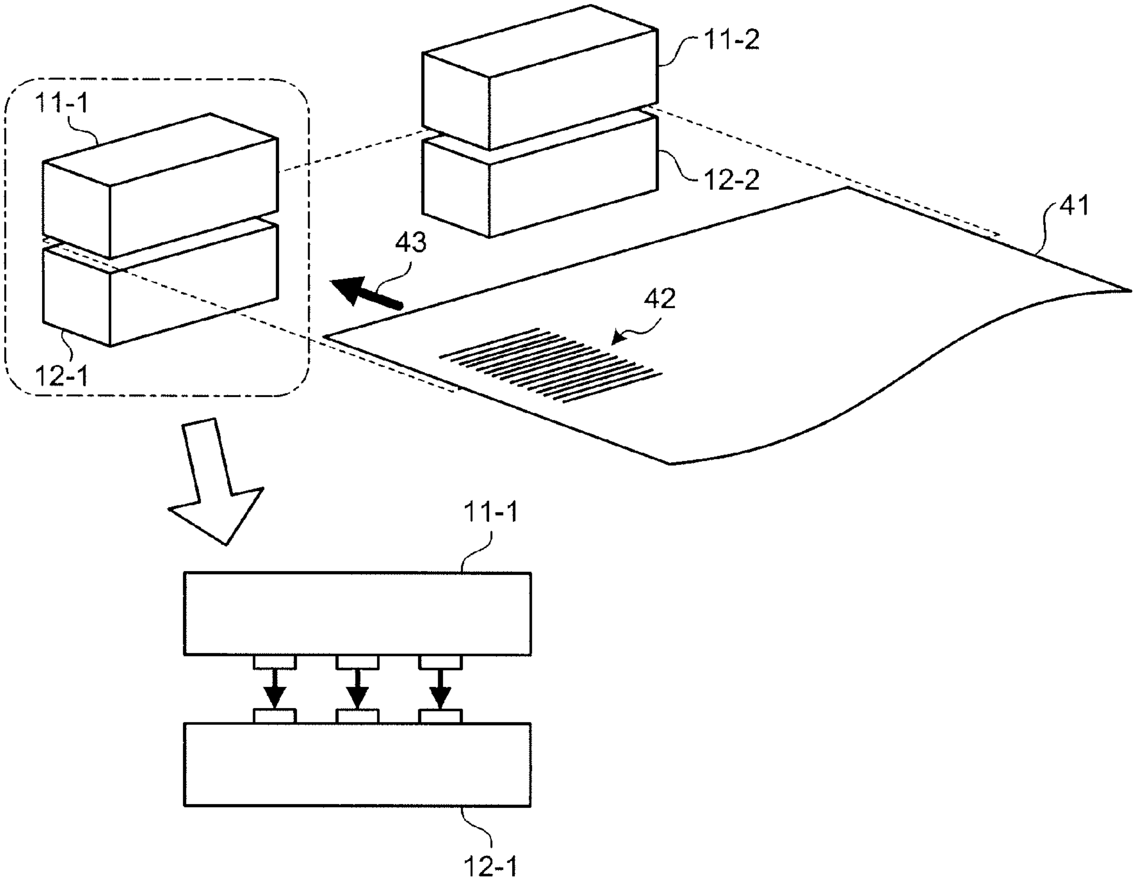
FIG. 4 is a schematic diagram of an example of an arrangement of a light-emitting module and a light-receiving module.

Subsequently, an example of an arrangement of the light-emitting module 11 and the light-receiving module 12 is explained with reference to FIG. 4. FIG. 4 is a schematic diagram of the example of the arrangement of the light-emitting module 11 and the light-receiving module 12. In the example shown in FIG. 4, two sets of the light-emitting module 11 and the light-receiving module 12 are arranged. The sets of the light-emitting module 11 and the light-receiving module 12 are denoted with reference numerals 11-1 and 12-1, and 11-2 and 12-2.

As shown in FIG. 4, a bar code 42 printed with anti-counterfeit ink is attached to a paper sheet 41. Incidentally, the bar code 42 shown in FIG. 4 is actually an invisible bar code. The bar code 42 is detected by the apparatus for determining the authenticity 10.

The paper sheet 41 is conveyed by a conveying mechanism (not shown) in a conveying direction 43. The set of the light-emitting module 11-1 and the light-receiving module 12-1 and the set of the light-emitting module 11-2 and the light-receiving module 12-2 respectively induce a fluorescence reaction of the anti-counterfeit ink, and receive a fluorescence excitation light, thereby reading a pattern or characters formed on the paper sheet with the anti-counterfeit ink, such as the bar code 42.

It may happen that the paper sheet 41 is conveyed askew in a direction perpendicular to the conveying direction 43 (a shift direction). However, as shown in FIG. 4, the light-emitting module 11-1 projects three rays of light to the paper sheet 41, and the light-receiving module 12-1 receives a fluorescence excitation light corresponding to each of the three rays of light. Therefore, when the bar code 42 is irradiated with at least any one of the rays of light, the apparatus for determining the authenticity 10 can determine the authenticity of the paper sheet 41.

In FIG. 4, the example where the light-emitting module 11-1/the light-receiving module 12-1 emits/receives three rays of light is illustrated. Likewise, the light-emitting module 11-2/the light-receiving module 12-2 also emits/receives three rays of light. Furthermore, the number of rays of light is not limited to three, and can be changed to any other number depending on, for example, a type of the paper sheet 41 subject to the verification.

Figure 5:
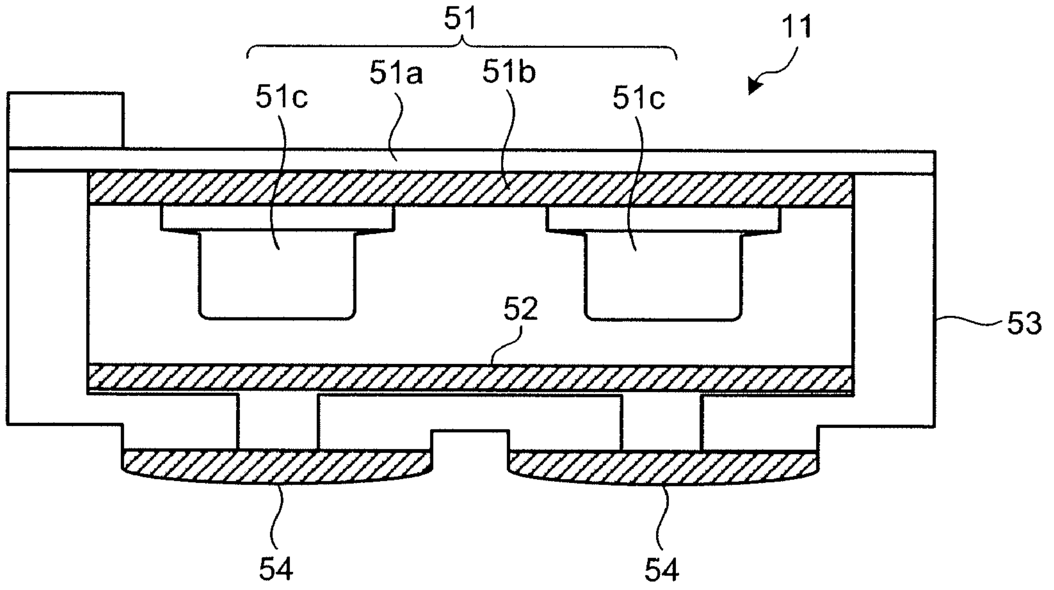
FIG. 5 is a schematic diagram of a configuration example of a light-emitting module in which a laser diode is employed as a light source.
Figure 6:
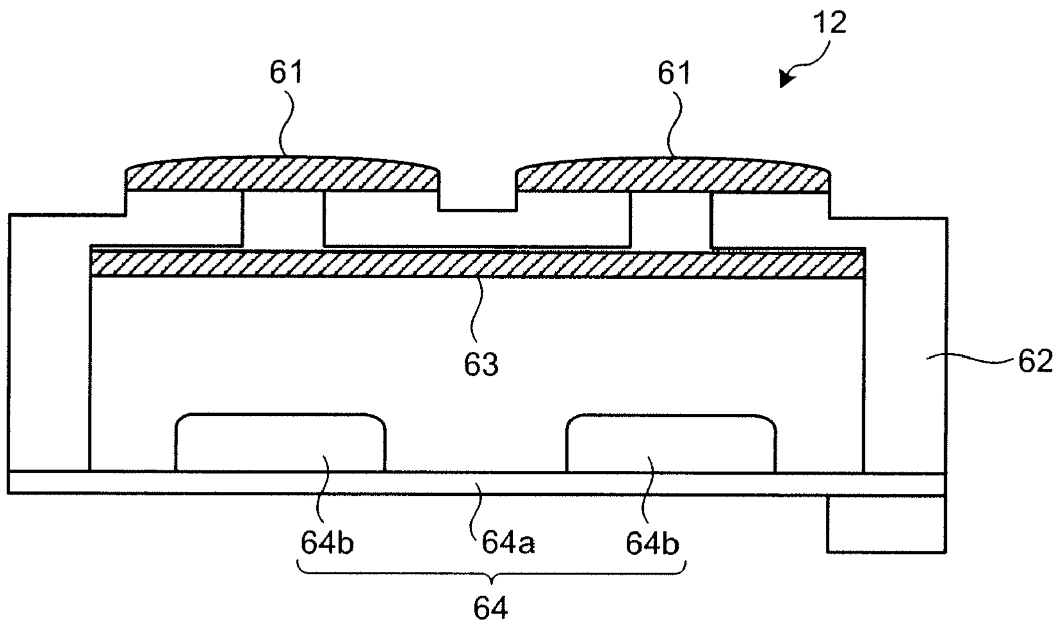
FIG. 6 is a schematic diagram of a configuration example of a light-receiving module corresponding to the light-emitting module that includes the laser diode.
Figure 7:
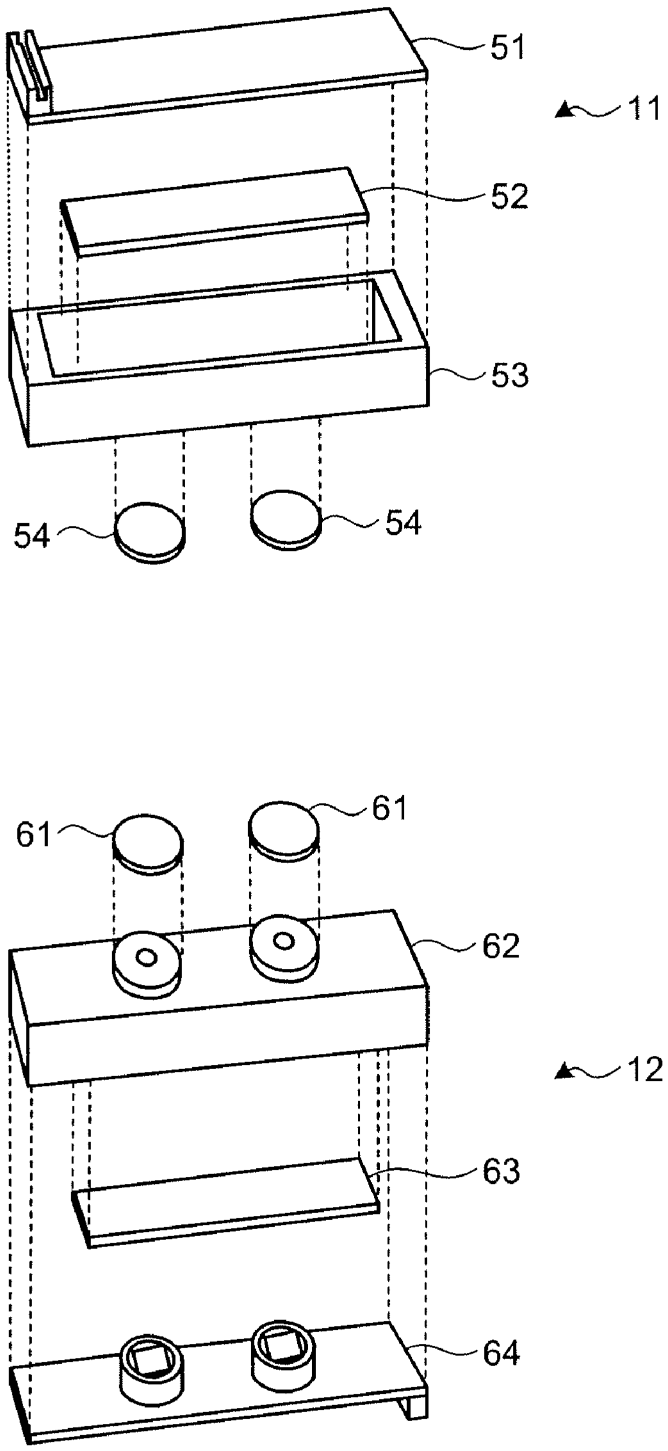
FIG. 7 depicts perspective views of the light-emitting module shown in FIG. 5 and the light-receiving module shown in FIG. 6.

Subsequently, there is described below configuration examples of the light-emitting module 11 and the light-receiving module 12 in a case where a laser diode (a light emitter having the wavelength characteristics indicated by the dashed line shown in the graph (A-1) in FIG. 3) is used as the light emitter (the light source) of the light-emitting module 11 with reference to FIGS. 5 to 7. FIG. 5 is a schematic diagram of a configuration example of the light-emitting module 11 in which a laser diode is employed as the light emitter. FIG. 6 is a schematic diagram of a configuration example of the light-receiving module 12 corresponding to the light-emitting module 11 that includes the laser diode. FIG. 7 depicts perspective views of the light-emitting module 11 shown in FIG. 5 and the light-receiving module 12 shown in FIG. 6.

First, the configuration example of the light-emitting module 11 that includes the laser diode is explained with reference to FIG. 5. As shown in FIG. 5, the light-emitting module 11 includes a light-emitting unit 51 including a circuit board 51*a*, a heat sink 51*b*, and laser diodes 51*c*; a short pass filter 52; a sensor case 53; and windows 54.

The light-emitting unit 51 includes the circuit board 51*a*, the heat sink 51*b*, and the laser diodes 51*c*. The circuit board 51*a* is a board on which a circuit and the like for controlling emissions of the laser diodes 51*c* are formed. The heat sink 51*b* is a member for dissipating heat generated by the laser diodes 51*c*. The laser diodes 51*c* are a light emitter having the wavelength characteristics indicated by the dashed line shown in the graph (A-1) in FIG. 3, and emit a parallel light toward the short pass filter 52 shown in FIG. 5.

Incidentally, in the example shown in FIG. 5, two pieces of the laser diodes 51*c* are arranged.

The short pass filter 52 is a filter having the wavelength characteristics shown in the graph (A-2) in FIG. 3. The short pass filter 52 blocks off a light of a wavelength longer than a center wavelength of an excitation light (see the reference numeral 31 in FIG. 3) out of the light emitted from the laser diodes 51*c*. The sensor case 53 is a housing made of a light shielding material, and houses therein the light-emitting unit 51 on the side of the laser diodes 51*c* and the short pass filter 52. The windows 54 are installed so as to cover two holes formed on the sensor case 53 from the outside.

Furthermore, the windows 54 are lenses for narrowing two rays of light transmitted through the short pass filter 52, and made of a transparent material such as an acrylic material. The two rays of light emitted from the two laser diodes 51*c* are filtered by the short pass filter 52, and narrowed down to, for example, 3 millimeters (mm) in diameter by the windows 54 respectively, and then emitted from the light-emitting module 11.

Subsequently, the configuration example of the light-receiving module 12 corresponding to the light-emitting module 11 that includes the laser diode is explained with reference to FIG. 6. As shown in FIG. 6, the light-receiving module 12 includes windows 61, a sensor case 62, an infrared transmission filter 63, and a light-receiving unit 64. The light-receiving unit 64 includes a circuit board 64*a* and photodiodes 64*b*.

The windows 61 are lenses for narrowing a light input from the outside to the light-receiving module 12, and made of a transparent material such as an acrylic material. The sensor case 62 is a housing made of a light shielding material, and houses therein the light-receiving unit 64 on the side of the photodiodes 64*b* and the infrared transmission filter 63. The windows 61 are installed so as to cover two holes formed on the sensor case 62 from the outside.

The infrared transmission filter 63 is a long pass filter made of plastic or glass. In the example shown in FIG. 6, the wavelength characteristics shown in the graph (B-1) in FIG. 3 are realized with one sheet of the infrared transmission filter 63. Alternatively, the wavelength characteristics shown in the graph (B-1) in FIG. 3 can be realized with a combination of a plurality of the same type of long pass filters or a combination of different types of long pass filters.

The light-receiving unit 64 includes the circuit board 64*a* and the photodiodes 64*b*. The circuit board 64*a* is a board on which a circuit and the like for controlling the photodiodes 64*b* are formed. The two photodiodes 64*b* are sensors for receiving two rays of light transmitted through the windows 61 and the infrared transmission filter 63. Incidentally, in the case shown in FIG. 6, two pieces of the photodiodes 64*b* are arranged.

Subsequently, the light-emitting module 11 shown in FIG. 5 and the light-receiving module 12 shown in FIG. 6 are explained with reference to FIG. 7. As shown in FIG. 7, the light-emitting module 11 is an assembly of the light-emitting unit 51, the short pass filter 52, the sensor case 53, and the windows 54 in this order. The light-receiving module 12 is an assembly of the windows 61, the sensor case 62, the infrared transmission filter 63, and the light-receiving unit 64 in this order.

Incidentally, FIGS. 5 to 7 show the configurations of the light-emitting module 11 and the light-receiving module 12 in the case where the laser diode is used as the light emitter. Alternatively, a commonly-used light-emitting diode that emits a non-parallel light can be used instead of the laser diode that emits a parallel light.

Figure 8:
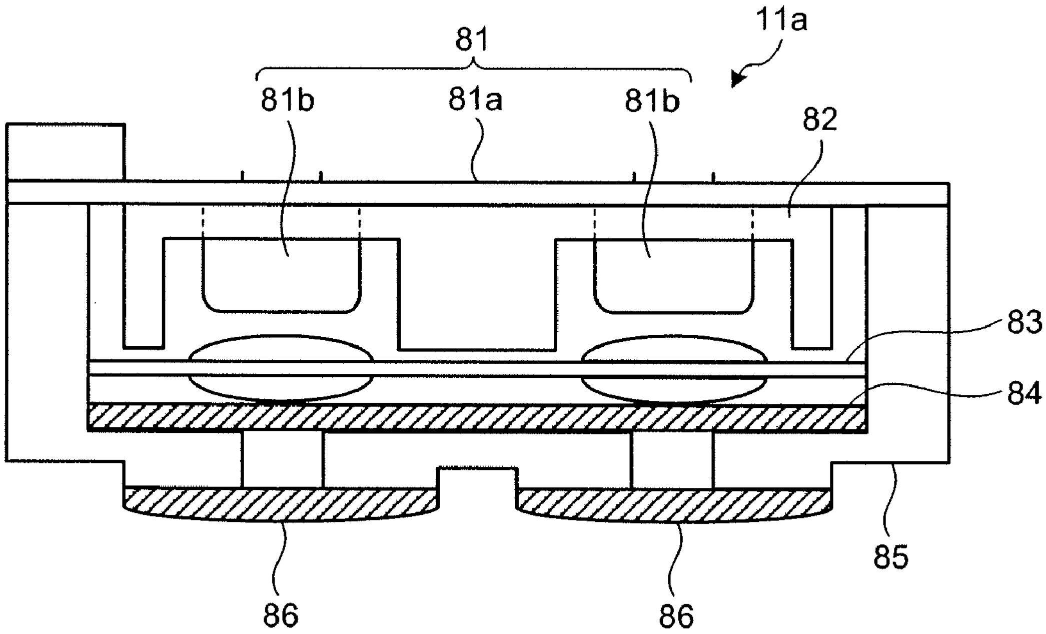
FIG. 8 is a schematic diagram of a configuration example of a light-emitting module in which a light-emitting diode is used as a light source.
Figure 9:
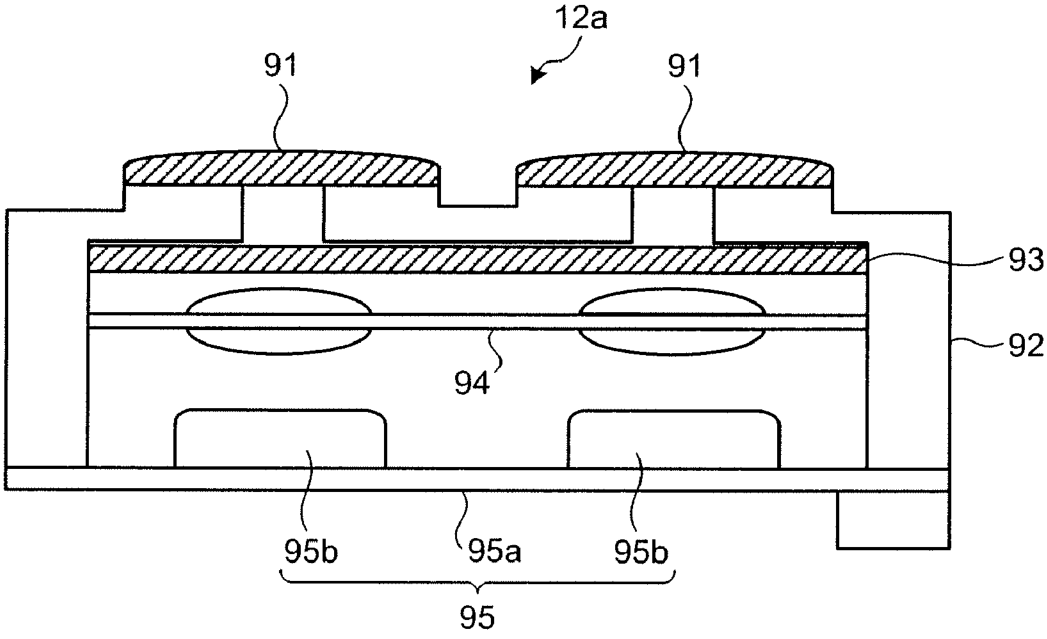
FIG. 9 is a schematic diagram of a configuration example of a light-receiving module corresponding to the light-emitting module that includes the light-emitting diode.
Figure 10:
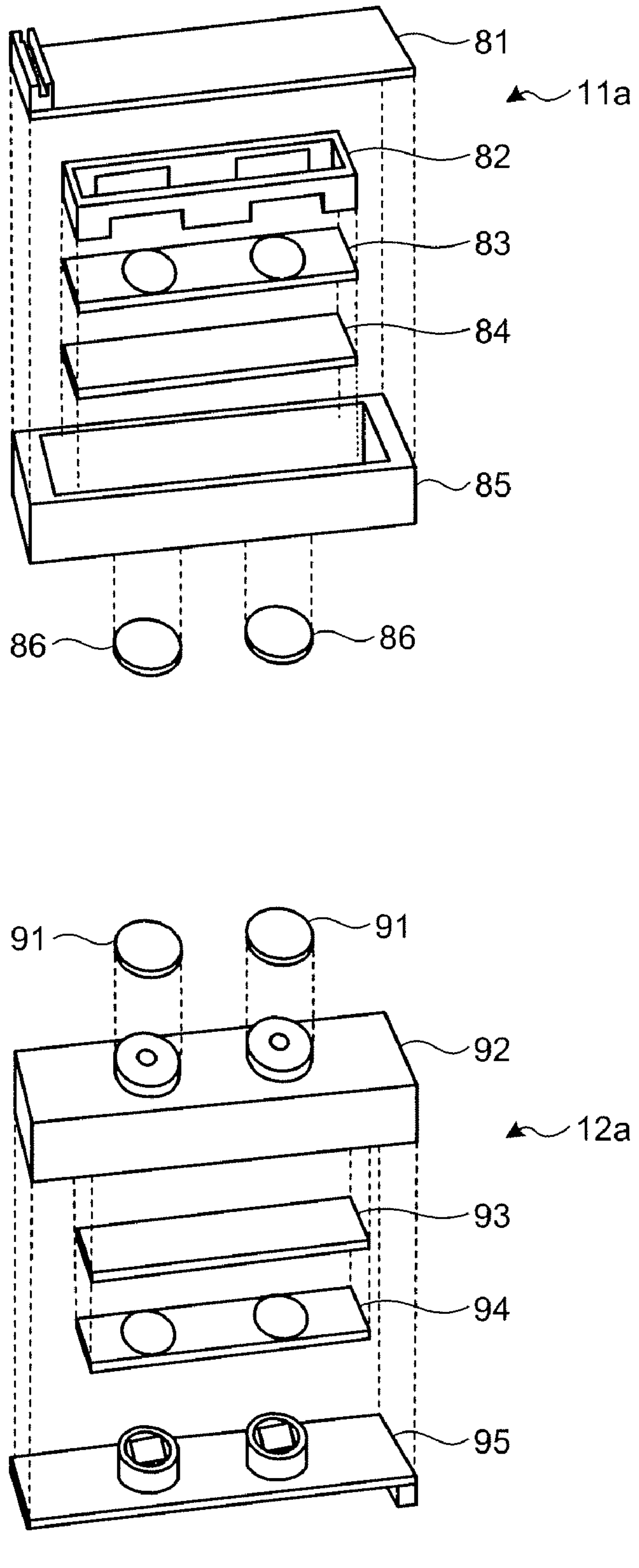
FIG. 10 depicts perspective views of the light-emitting module shown in FIG. 8 and the light-receiving module shown in FIG. 9.

There is described below configuration examples of a light-emitting module 11*a* and a light-receiving module 12*a*, in a case where a light-emitting diode (a light emitter having the wavelength characteristics indicated by the solid line shown in the graph (A-1) in FIG. 3) is used as a light emitter (the light source) of the light-emitting module 11*a* with reference to FIGS. 8 to 10. FIG. 8 is a schematic diagram of a configuration example of the light-emitting module 11*a* in which a light-emitting diode is employed as a light emitter. FIG. 9 is a schematic diagram of a configuration example of the light-receiving module 12*a* corresponding to the light-emitting module 11*a* that includes the light-emitting diode. FIG. 10 depicts perspective views of the light-emitting module 11*a* shown in FIG. 8 and the light-receiving module 12*a* shown in FIG. 9.

First, the configuration example of the light-emitting module 11*a* that includes the light-emitting diode is explained with reference to FIG. 8. As shown in FIG. 8, the light-emitting module 11*a* includes a light-emitting unit 81 including a circuit board 81*a* and light-emitting diodes 81*b*; a spacer 82; a lens 83; a short pass filter 84; a sensor case 85; and windows 86.

The light-emitting unit 81 includes the circuit board 81*a* and the light-emitting diodes 81*b*. The circuit board 81*a* is a board on which a circuit and the like for controlling emissions of the light-emitting diodes 81*b* are formed. The light-emitting diodes 81*b* are a light emitter having the wavelength characteristics indicated by the solid line shown in the graph (A-1) in FIG. 3, and emit a non-parallel light toward the lens 83 shown in FIG. 8. Incidentally, in the example shown in FIG. 8, two pieces of the light-emitting diodes 81*b* are arranged.

The spacer 82 is a member for blocking rays of light emitted in a lateral direction from the light-emitting diodes 81*b*. The lens 83 is a member for collecting rays of light from the light-emitting diodes 81*b*. Two convex portions are formed on each of both surfaces of the lens 83. The lens 83 collects the rays of light from the two light-emitting diodes 81*b* with the two convex portions, and gets the collected light therethrough toward the short pass filter 84.

The lens 83 collects a light, which is weak and non-parallel, from each of the light-emitting diodes 81*b* and increases the intensity of the light and also converts the non-parallel light into a parallel light beam.

The short pass filter 84 is a filter having the wavelength characteristics shown in the graph (A-2) in FIG. 3. The short pass filter 84 blocks off a light of a wavelength longer than a center wavelength of an excitation light (see the reference numeral 31 in FIG. 3) out of the light emitted from the light-emitting diodes 81*b*. The sensor case 85 is a housing made of a light shielding material, and houses therein the light-emitting unit 81 on the side of the light-emitting diodes 81*b*, the spacer 82, the lens 83, and the short pass filter 84. The windows 86 are installed so as to cover two holes formed on the sensor case 85 from the outside.

Furthermore, the windows 86 are respectively a member including a lens for narrowing a corresponding ray of two rays of light transmitted through the short pass filter 84, and made of a transparent material such as an acrylic material. The two rays of light emitted from the two light-emitting diodes 81*b* are collected by the lens 83, filtered by the short pass filter 84, and narrowed down to, for example, 3 mm in diameter by the windows 86 respectively, and then projected from the light-emitting module 11*a*.

Subsequently, the configuration example of the light-receiving module 12*a* corresponding to the light-emitting module 11*a* that includes the light-emitting diode is explained with reference to FIG. 9. As shown in FIG. 9, the light-receiving module 12*a* includes windows 91, a sensor case 92, an infrared transmission filter 93, a lens 94, and a light-receiving unit 95. The light-receiving unit 95 includes a circuit board 95*a* and photodiodes 95*b*.

The windows 91 are respectively a member including a lens for narrowing a light input from the outside to the light-receiving module 12*a*, and made of a transparent material such as an acrylic material. The sensor case 92 is a housing made of a light shielding material, and houses therein the light-receiving unit 95 on the side of the photodiodes 95*b*, the lens 94, and the infrared transmission filter 93. The windows 91 are installed so as to cover two holes formed on the sensor case 92 from the outside.

The infrared transmission filter 93 is a long pass filter made of plastic or glass. In the example shown in FIG. 9, the wavelength characteristics shown in the graph (B-1) in FIG. 3 are realized with one sheet of the infrared transmission filter 93. Alternatively, the wavelength characteristics shown in the graph (B-1) in FIG. 3 can be realized with a combination of a plurality of the same type of long pass filters or a combination of different types of long pass filters.

The lens 94 is a member for collecting rays of light transmitted through the infrared transmission filter 93. Two convex portions are formed on each of both surfaces of the lens 94. The lens 94 collects the two rays of light with the two convex portions, and gets the collected light therethrough toward the photodiodes 95*b*. The lens 94 collects a weak light input to the light-receiving module 12*a* so as to increase an intensity of light, and converts a non-parallel light into a parallel light beam.

The light-receiving unit 95 includes the circuit board 95*a* and the photodiodes 95*b*. The circuit board 95*a* is a board on which a circuit and the like for controlling the photodiodes 95*b* are formed. The photodiodes 95*b* are sensors for receiving two rays of light transmitted through the windows 91, the infrared transmission filter 93, and the lens 94. Incidentally, in the example shown in FIG. 9, two numbers of the photodiodes 95*b* are arranged.

Subsequently, the light-emitting module 11*a* shown in FIG. 8 and the light-receiving module 12*a* shown in FIG. 9 are explained with reference to FIG. 10. As shown in FIG. 10, the light-emitting module 11*a* is an assembly of the light-emitting unit 81, the spacer 82, the lens 83, the short pass filter 84, the sensor case 85, and the windows 86 in this order.

The light-receiving module 12*a* is an assembly of the windows 91, the sensor case 92, the infrared transmission filter 93, the lens 94, and the light-receiving unit 95 in this order.

Figure 11:
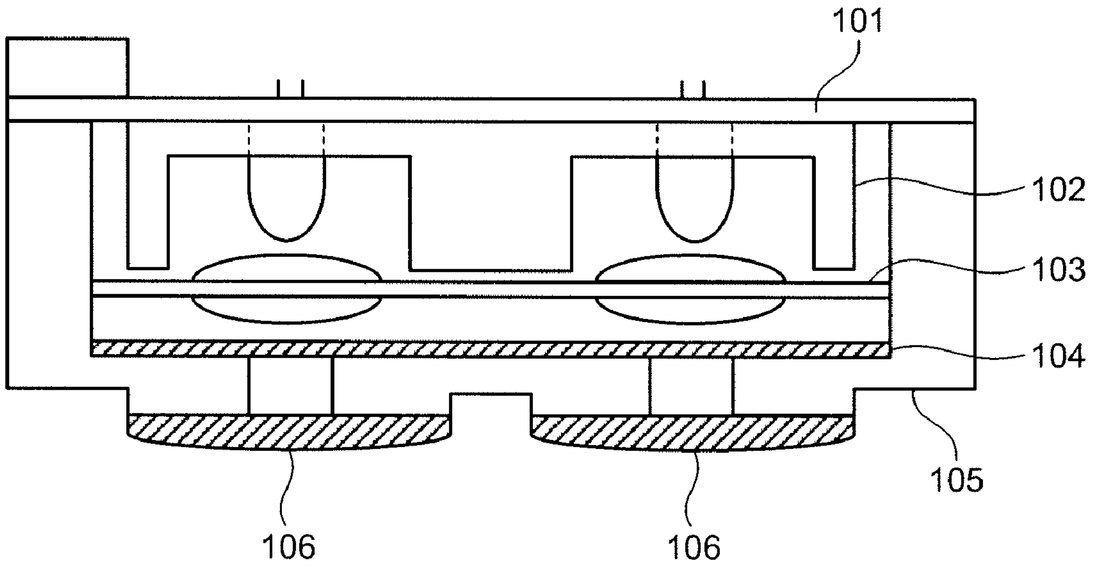
FIG. 11 is a schematic diagram of a configuration example of a light-emitting module according to a modified example.

Each of the light-emitting module and the light-receiving module can be configured with a configuration other than those shown in FIGS. 5 to 10. A modified example of the configuration of the light-emitting module will be explained below with reference to FIG. 11. FIG. 11 is a schematic diagram of a configuration example of a light-emitting module according to the modified example.

As shown in FIG. 11, the light-emitting module according to the modified example includes a circuit board 101 on which a light source having illuminance characteristics of a bullet type of light source is provided; a spacer 102; a lens 103 with two convex portions on each of both surfaces thereof; a short pass filter 104; a sensor case 105; and windows 106. The convex portions of the lens 103 are adjusted so as to convert a light from the light source having the illuminance characteristics of the bullet-type one into a parallel light. In this manner, by the use of the lens 103 corresponding to the light source having the illuminance characteristics of the bullet-type one, rays of light output from the light-emitting module can be narrowed.

As described above, in the present embodiment, an apparatus for determining the authenticity determines the authenticity of a paper sheet to which such a substance that excites a light including a second wavelength longer than a first wavelength when irradiated with a light including the first wavelength is attached. The apparatus for determining the authenticity includes a light-emitting unit that emits the light including the first wavelength to the paper sheet; a first blocking unit (a short pass filter) that is arranged between the light-emitting unit and the paper sheet, and blocks off a light of a wavelength longer than the first wavelength; a light-receiving unit that receives a light including the second wavelength emitted from the paper sheet; a second blocking unit (a long pass filter) that is arranged between the light-receiving unit and the paper sheet, and blocks off a light of a wavelength shorter than the second wavelength; and an authenticity determining unit that determines the authenticity of the paper sheet based on the light received by the light-receiving unit.

In this manner, a light of a wavelength longer than the first wavelength is blocked off by the first blocking unit (the short pass filter) provided in the light-emitting unit, and a light of a wavelength shorter than the second wavelength is blocked off by the second blocking unit (the long pass filter) provided in the light-receiving unit. Therefore, the light-receiving unit can reliably receive only a light of a wavelength around the second wavelength, and thus it is possible to improve the accuracy of authenticity determination of a paper sheet to which anti-counterfeit ink is attached. Furthermore, the light-emitting unit uses a commonly-used light-emitting diode, and limits a wavelength of a light to be received by the light-receiving unit with the filter. Therefore, it is possible to keep the production cost of the apparatus for determining the authenticity down.

Moreover, in the above embodiments, the light-emitting unit collects a light emitted from the light source, and emits the collected light to a paper sheet. Therefore, even when the light intensity of the light source is low, the apparatus for determining the authenticity can reliably determine the authenticity of the paper sheet to which anti-counterfeit ink is attached.

Furthermore, in the above embodiments, the apparatus for determining the authenticity further includes a first narrowing unit that is arranged between the first blocking unit (the short pass filter) and the paper sheet, and narrows a light transmitted through the first blocking unit (the short pass filter) to have a circular shape; and a second narrowing unit that is arranged between the second blocking unit (the long pass filter) and the paper sheet to be opposed to the first narrowing unit, and narrows a light emitted from the paper sheet to have a circular shape. Therefore, a diameter of a ray of light to be transmitted/received can be arbitrarily narrowed, so that it is possible to detect a detailed pattern formed with anti-counterfeit ink.

Moreover, in the above embodiments, it is assumed that the first wavelength is a wavelength in a range of 750 nm to 810 nm, and the second wavelength is a wavelength in a range of 880 nm to 1000 nm. Therefore, it is possible to detect anti-counterfeit ink having such fluorescence characteristics.

Incidentally, in the above embodiments, such a long pass filter that transmits a light of a wavelength exceeding a predetermined wavelength is used in the light-receiving unit. Alternatively, a band-pass filter that transmits a light in a predetermined range of wavelengths can be used instead of the long pass filter. Likewise, instead of the short pass filter, a band-pass filter capable of adjusting a range of wavelengths of light to be transmitted can be used in the light-emitting unit.

Furthermore, in the above embodiments, the light-emitting unit is arranged on one side of a conveying path on which the paper sheet is conveyed, and the light-receiving unit is arranged on the other side of the conveying path. Alternatively, the light-emitting unit and the light-receiving unit can be arranged on the same side of the conveying path.

In this manner, the apparatus for determining the authenticity according to the present invention is useful in determining the authenticity of a paper sheet to which anti-counterfeit ink is attached, and especially, is suitable for improving an accuracy of authenticity determination with keeping the production cost down.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An apparatus for determining the authenticity of a paper sheet to which such a substance that excites a light including a second wavelength longer than a first wavelength when irradiated with a light including the first wavelength is attached, the apparatus comprising:

a light-emitting unit that emits the light including the first wavelength to the paper sheet;

a first blocking unit that is arranged between the light-emitting unit and the paper sheet, and blocks off a light of a wavelength longer than the first wavelength;

a light-receiving unit that receives a light including the second wavelength emitted from the paper sheet;

a second blocking unit that is arranged between the light-receiving unit and the paper sheet, and blocks off a light of a wavelength shorter than the second wavelength; and an authenticity determining unit that determines the authenticity of the paper sheet based on the light received by the light-receiving unit.

2. The apparatus for determining the authenticity according to claim 1, wherein the light-emitting unit includes a light source that emits the light including the first wavelength to the paper sheet; and a light-collecting unit that collects the light emitted from the light source and emits the collected light to the paper sheet.

3. The apparatus for determining the authenticity according to claim 1, further comprising:

a first narrowing unit that is arranged between the first blocking unit and the paper sheet, and narrows the light transmitted through the first blocking unit to have a circular shape; and a second narrowing unit that is arranged between the second blocking unit and the paper sheet to be opposed to the first narrowing unit, and narrows the light emitted from the paper sheet to have a circular shape.

4. The apparatus for determining the authenticity according to claim 1, wherein the first wavelength is a wavelength in a range of 750 nanometers to 810 nanometers, and the second wavelength is a wavelength in a range of 880 nanometers to 1000 nanometers.

5. The apparatus for determining the authenticity according to claim 2, wherein the light source is a laser diode.

6. The apparatus for determining the authenticity according to claim 2, wherein the light source is a light-emitting diode.

7. The apparatus for determining the authenticity according to claim 1, wherein the first blocking unit includes a short pass filter.

8. The apparatus for determining the authenticity according to claim 1, wherein the second blocking unit includes a long pass filter.

9. The apparatus for determining the authenticity according to claim 8, wherein the long pass filter includes a plurality of same type of long pass filters.

10. The apparatus for determining the authenticity according to claim 8, wherein the long pass filter includes a plurality of different types of long pass filters.

* * * * *